(12) United States Patent
Belongia et al.

(10) Patent No.: US 7,810,674 B2
(45) Date of Patent: Oct. 12, 2010

(54) LIQUID DISPENSING SYSTEM WITH ENHANCED MIXING

(75) Inventors: Brett M. Belongia, North Andover, MA (US); Robert C. Saunders, North Andover, MA (US)

(73) Assignee: Millipore Corporation, Billerica, MA (US)

( * ) Notice: Subject to any disclaimer, the term of this patent is extended or adjusted under 35 U.S.C. 154(b) by 883 days.

(21) Appl. No.: 11/189,358

(22) Filed: Jul. 26, 2005

(65) Prior Publication Data

US 2007/0023449 A1 Feb. 1, 2007

(51) Int. Cl.
*B67D 1/00* (2006.01)
(52) U.S. Cl. .......................... 222/64; 222/424; 366/136
(58) Field of Classification Search .............. 222/63, 222/64, 107, 318, 251, 424, 109; 366/136, 366/137, 152.1, 153.1; 137/393, 337, 340, 137/454.4
See application file for complete search history.

(56) References Cited

U.S. PATENT DOCUMENTS

| | | | | |
|---|---|---|---|---|
| 1,947,851 | A | 2/1934 | Jewett | 259/95 |
| 2,764,722 | A | 9/1956 | McKeown et al. | 318/207 |
| 3,185,348 | A | 5/1965 | Pollak et al. | 222/95 |
| 3,570,715 | A * | 3/1971 | Evers | 222/54 |
| 3,642,047 | A | 2/1972 | Waage | |
| 3,790,029 | A | 2/1974 | Ward | 222/129.4 |
| 3,815,822 | A * | 6/1974 | Davies et al. | 239/125 |
| 4,026,669 | A | 5/1977 | Leonard et al. | |
| 4,069,841 | A * | 1/1978 | Bartlett | 137/565.34 |
| 4,276,270 | A | 6/1981 | Gragg et al. | 423/167 |
| 4,322,298 | A | 3/1982 | Persidsky | 210/787 |
| 4,396,383 | A | 8/1983 | Hart | |
| 4,493,705 | A | 1/1985 | Gordon et al. | 604/122 |

(Continued)

FOREIGN PATENT DOCUMENTS

CA 2051438 10/1990

(Continued)

OTHER PUBLICATIONS

Internet citation Oct. 30, 2003, pp. 1-4, XP002382559 "Fortschrittliche Herstellungsprozesse fur halbfeste Produkte".

(Continued)

*Primary Examiner*—Lien T Ngo
(74) *Attorney, Agent, or Firm*—Nields, Lemack & Frame, LLC

(57) ABSTRACT

A dispense apparatus and system for dispensing suspensions or emulsions. The system ensures uniformity of distribution of the dispersed phase within the continuous-phase liquid by moving the fluid through the dispense cartridge, such as with a continuous or pulsating flow. In one embodiment, peristaltic pumps are positioned upstream and downstream of the dispense cartridge, in fluid communication with and forming a single loop with a fluid source. Circulation between the fluid source and the dispense cartridge is maintained. In a second embodiment, a pump circulates fluid into and out of the dispense cartridge and is also in fluid communication with a fluid source such as with a pinch valve to allow proper filling of the dispense cartridge from the fluid source. In a third embodiment, a reversing pump is placed between the dispense cartridge and fluid source to continually or continuously pump fluid into and out of the dispense cartridge.

9 Claims, 5 Drawing Sheets

U.S. PATENT DOCUMENTS

| | | | |
|---|---|---|---|
| 4,608,178 A | 8/1986 | Johansson et al. | 210/744 |
| 4,734,269 A | 3/1988 | Clarke et al. | 96/156 |
| 4,793,515 A * | 12/1988 | Shannon et al. | 222/69 |
| 4,863,454 A | 9/1989 | LaBove | |
| 4,976,707 A | 12/1990 | Bodicky et al. | 604/408 |
| 5,004,571 A | 4/1991 | Litz et al. | 261/91 |
| 5,114,045 A | 5/1992 | Herpe | 222/105 |
| 5,121,857 A * | 6/1992 | Hutchinson | 222/318 |
| 5,137,175 A | 8/1992 | Kowalski et al. | 222/1 |
| 5,251,982 A | 10/1993 | Stenstrom et al. | |
| 5,480,063 A | 1/1996 | Keyes et al. | 222/64 |
| 5,493,765 A * | 2/1996 | Klebl et al. | 29/407.08 |
| 5,538,462 A * | 7/1996 | Gnadt | 451/114 |
| 5,570,815 A | 11/1996 | Ramsay | 222/95 |
| 5,680,960 A | 10/1997 | Keyes et al. | 222/64 |
| 5,683,508 A * | 11/1997 | Bleiler et al. | 118/46 |
| 5,697,407 A | 12/1997 | Lasonde | 141/104 |
| 5,810,037 A * | 9/1998 | Sasaki et al. | 134/111 |
| 5,957,759 A | 9/1999 | Cardenas et al. | 451/60 |
| 6,027,240 A | 2/2000 | Han | 366/101 |
| 6,053,885 A | 4/2000 | Beshel | |
| 6,079,633 A * | 6/2000 | Inoue et al. | 239/1 |
| 6,183,460 B1 | 2/2001 | Smith et al. | |
| 6,203,667 B1 * | 3/2001 | Huhtelin | 162/253 |
| 6,491,679 B1 | 12/2002 | Okamoto et al. | |
| 6,726,771 B2 | 4/2004 | Ueda | 118/633 |
| 6,779,685 B2 * | 8/2004 | Nelson | 222/1 |
| 2002/0147440 A1 | 10/2002 | Samolyk | 604/411 |
| 2003/0198125 A1 | 10/2003 | Linsen et al. | 366/152.1 |
| 2004/0164092 A1 | 8/2004 | DiLeo | 222/64 |
| 2005/0029301 A1 | 2/2005 | Belongia et al. | 222/189.09 |
| 2005/0146982 A1 | 7/2005 | Carlson et al. | 366/136 |
| 2005/0284882 A1 | 12/2005 | Belongia | 222/64 |
| 2007/0064519 A1 | 3/2007 | Neumann | 366/136 |

FOREIGN PATENT DOCUMENTS

| | | |
|---|---|---|
| CN | 1047813 | 12/1990 |
| DE | 670 057 | 1/1939 |
| DE | 1 472 745 | 2/1972 |
| DE | 1472745 | 2/1972 |
| EP | 1 750 103 | 2/2007 |
| FR | 2 411 318 | 7/1979 |
| GB | 652142 | 4/1951 |
| GB | 731815 | 6/1955 |
| GB | 891 334 | 3/1962 |
| JP | 2002-113342 | 4/2002 |
| NL | 7901305 | 8/1980 |
| WO | 82/03797 | 11/1982 |
| WO | 91/10615 | 7/1991 |
| WO | 01/28889 | 4/2001 |
| WO | 03/002590 | 1/2003 |
| WO | 2005/011852 | 2/2005 |

OTHER PUBLICATIONS

"Peristaltic Pump" pp. 1-2, XP002451276 ; Internet.
The European communication dated Mar. 17, 2009 .
The European communication dated Mar. 18, 2009.
Chinese communication dated Mar. 20, 2009.
European communication dated Mar. 12, 2009.
Chinese communication dated Jul. 3, 2009.
Office Action from co-pending U.S. Appl. No. 11/649,576 dated Jun. 30, 2009.
Japanese communication dated Oct. 27, 2009.
Singapore communication dated Jan. 19, 2010.
European communication dated Feb. 5, 2010.
The European Communication dated Jul. 31, 2009.
The European communication dated Sep. 8, 2009.
Chinese communication dated Nov. 13, 2009.
OA dated Dec. 16, 2009 in co-pending U.S. Appl. No. 11/649,576.
Copy of Indian communication dated Jun. 24, 2008.
Office Action dated May 27, 2010 in co-pending U.S. Appl. No. 11/649,576.
Indian communication dated Jul. 16, 2010 in co-pending foreign application (IN59/DEL/2007).
European communication dated Jul. 12, 2010 in counterpart foreign application (EP09151128.7).
European communication dated Jul. 12, 2010 in counterpart foreign application (EP06253702.2).
Japanese communication dated Jul. 27, 2010 in a co-pending foreign application (JP2007-003366 (MCA-724-JP)).

* cited by examiner

US 7,810,674 B2

LIQUID DISPENSING SYSTEM WITH ENHANCED MIXING

BACKGROUND OF THE INVENTION

There are various types of dispensing apparatuses for filling parenteral and opthalmic products into vials and containers. One such type is positive displacement fillers. These devices employ a cylinder and piston arrangement, which contacts and dispenses the fluid. Typically, fluid enters the cylinder as the piston is in its upward motion, which creates a vacuum into which the fluid enters through an inlet port. The downward motion of the piston expels the fluid through an outlet port. The process can then be repeated. Other embodiments of positive displacement fillers also exist, such as those using rotary pumps.

While these fillers are popular due to their speed and accuracy, their application is limited, especially in the pharmaceutical field. These devices are very difficult to clean, and typically must be disassembled to be sterilized. Also, since the device actually contacts the fluid, contamination is a constant risk.

Another type of dispensing apparatus is the time/pressure filler. These typically include a fluid chamber that is held under constant pressure. Fluid is dispensed through a discharge line, which is controlled by a pinch type valve. The valve is opened for a precise amount of time to dispense fluid. Since the pressure is held constant, and the time interval is constant, the amount of fluid dispensed should also be constant. However, due to variances in the equipment and deformation of the discharge tube over time, these systems are less accurate than required for many applications.

A third type of dispensing apparatus is the volumetric dispensing apparatus, as shown in U.S. Pat. Nos. 5,680,960, 5,480,063, and Publication No. 2005-0029301, which are hereby incorporated by reference. These devices measure and dispense a predetermined volume of fluid. These systems are highly accurate and avoid problems of contamination common with positive displacement apparatus, since there are no moving parts in contact with the fluid.

The above mentioned apparatus can all be used to dispense single-phase fluids but all of the apparatus described suffer from one or more significant drawbacks when dispensing solids dispersed in liquid (suspensions) or droplets of one liquid suspended in another liquid (emulsions). Suspension products, such as vaccines or steroid products may settle when not properly agitated. In the case of emulsions, the two liquids will form droplets when they are agitated but when agitation stops, the droplets may separate into two separate layers. Either of these cases will result in poor content uniformity from one vial to the next during the final dispensing of the product.

In addition, it can be difficult to clean the process equipment that has contained suspensions or emulsions, resulting in labor intensive cleaning procedures and significant downtime to change from one batch to another. Since the final drug product must remain sterile, rigorous aseptic processes must be adhered to in the reassembly of the dispensing apparatus.

It is therefore an object of the present invention to provide a dispensing system that has provision for the mixing of suspension and emulsion products, while maintaining the integrity of the system so that sterility is not negatively impacted. It is also an objective of this invention to minimize the amount of time spent cleaning the delivery system therefore minimizing the amount of downtime required.

SUMMARY OF THE INVENTION

The problems of the prior art have been overcome by the present invention, which provides a novel dispense cartridge suitable for installation into a host apparatus for dispensing suspensions or emulsions. The fluid dispense cartridge is particularly well suited to be manufactured in a single-use format comprising a fluid reservoir and fill tube assembly, particularly comprising a reservoir, tubing, fittings and connectors, and a needle. The system ensures uniformity within the liquid by moving the fluid through the product reservoir such as with a continuous or pulsating flow.

In one embodiment, peristaltic pumps, or other non-invasive pumping apparatus, are positioned upstream and downstream of the fluid reservoir, in fluid communication with and forming a single loop with a well-mixed fluid source. Circulation between the fluid source and the reservoir is maintained so as to ensure a constant liquid level in the reservoir.

In a second embodiment, a peristaltic pump, or other non-invasive pumping apparatus, circulates fluid through the reservoir. A well-mixed fluid source feeds liquid to the recirculation line via a second pump or pinch valve to maintain a proper fluid level in the reservoir.

In a third embodiment, a reversing pump is placed between the reservoir and fluid source to periodically or continuously pump fluid into and out of the reservoir.

The single-use format allows for easy installation, pre-sterilization, and easy clean-up which will result in minimal downtime, significant cleaning chemical cost reduction, and greater ensured sterility. The shape and material of the reservoir are critical in maintaining product uniformity.

DETAILED DESCRIPTION OF THE INVENTION

The dispense system described here consists of a single-use dispense cartridge and a hardware component onto which the dispense cartridge can be installed. The hardware system is described in the prior art (U.S. Pat. Nos. 5,680,960 and 5,480,063, the disclosures incorporated herein by reference). The present invention provides for a novel dispense cartridge and method that allows for the accurate dispensing of suspensions or emulsions.

Preferably the fluid reservoir section of the dispense cartridge is a pliable or flexible chamber or bladder, which expands and contracts to maintain a constant internal pressure. Disposable bag-like enclosures are particularly suitable. The tubing section of the dispense cartridge consists of flexible tubing such as silicone, polyethylene, or other elastomer or polymer based tubing attached together with plastic connectors made of materials such as polyethylene, polypropylene, or poly-fluorocarbons.

Figure 1:
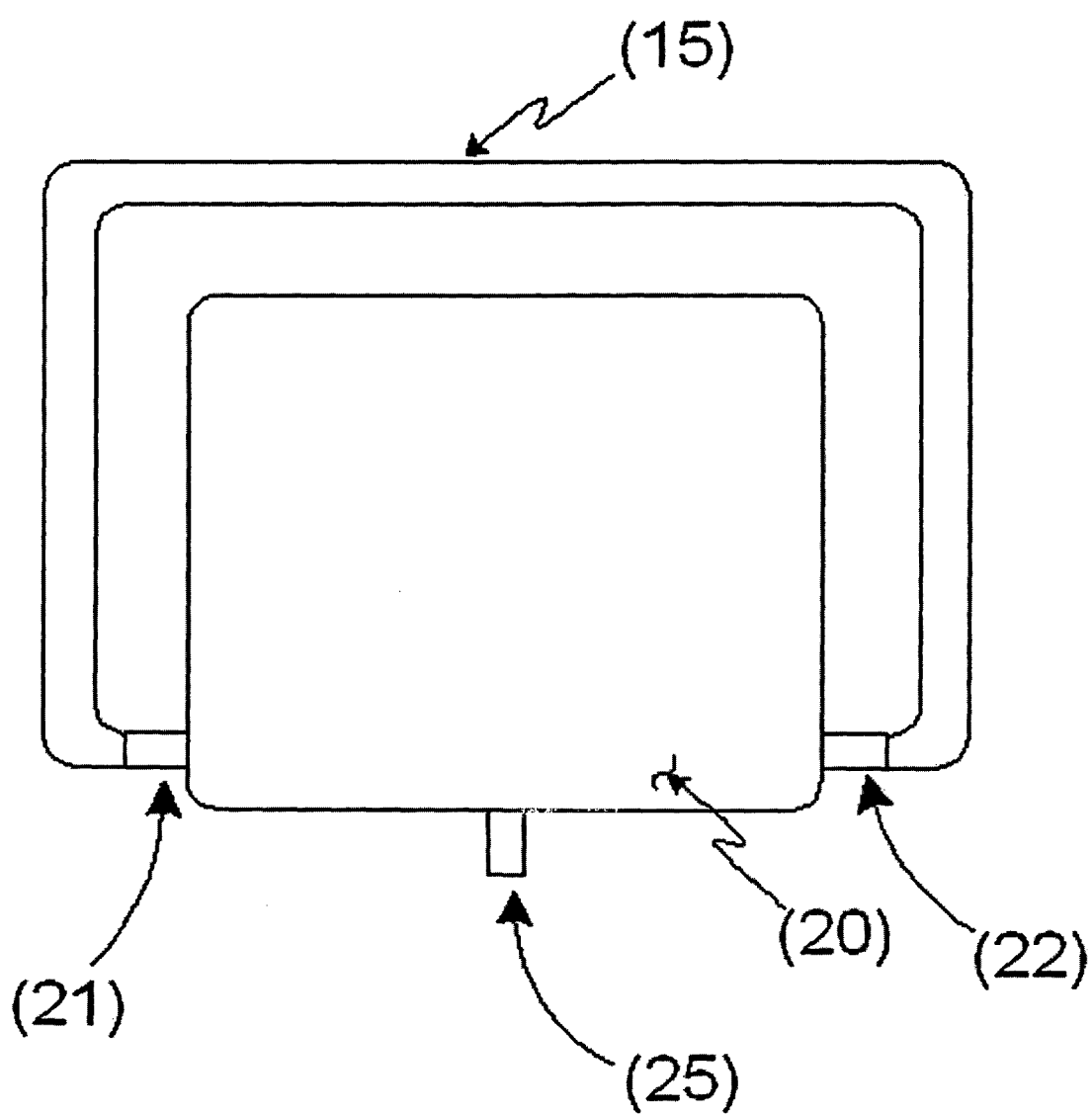
FIG. 1 is a schematic diagram showing one embodiment of a dispense cartridge.

FIG. 1 shows one embodiment of the dispense cartridge. An inlet (21) and outlet (22) port on the reservoir (20) are connected with a tubing loop (15). A port (25) on the bottom of the reservoir (20) is provided to allow liquid to move to the tubing assembly used to deliver the product to its final containers (not shown).

Figure 2:
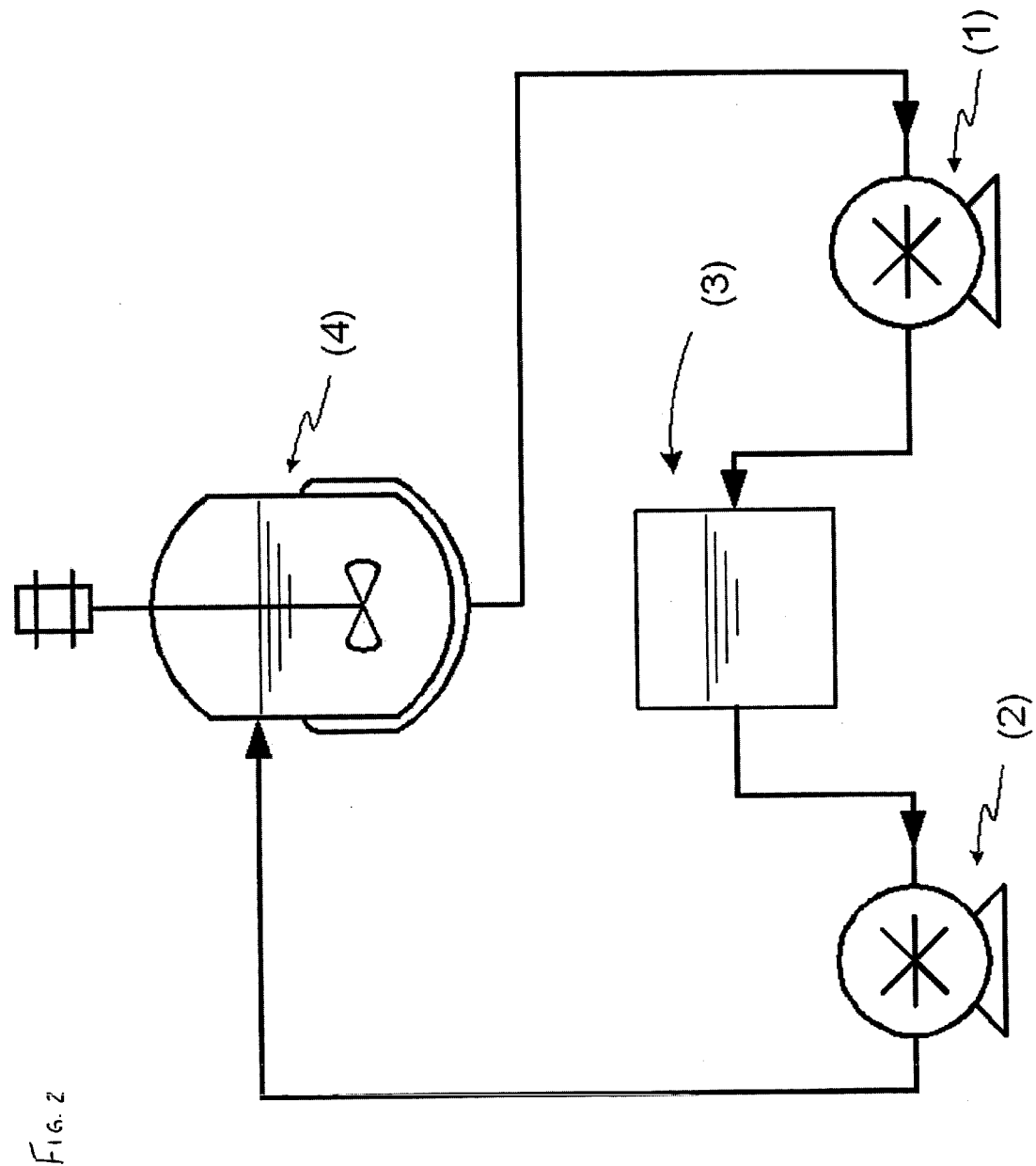
FIG. 2 is a schematic diagram showing a first embodiment of the dispense system in accordance with the present invention.

FIG. 2 shows a single-loop dispensing system in accordance with one embodiment of the present invention. The system includes a feed pump (1) in fluid communication with a well mixed, bulk fluid supply source (4) and with the inlet or fill port of a fluid reservoir of the dispense cartridge (3), and a draw pump (2) in fluid communication with an outlet of reservoir of the dispense cartridge (3) and the feed to the well mixed bulk fluid supply source (4). Configuring the feed pump (1) and draw pump (2) in this way isolates the dispense cartridge (3) from the weight or pressure of the fluid column in the re-circulation line. Any type of non-invasive pumping apparatus can be used, but peristaltic pumps are particularly advantageous for pharmaceutical applications, because the fluid does not contact any components of the pump and seals and valves are not necessary.

A level sensor (part of the hardware system—not shown) such as an optical sensor or capacitance sensor can be used to monitor the fluid level in the reservoir of the dispense cartridge (3), and the pump speeds may be controlled thereby to maintain a consistent fluid level. Alternatively, a level switch can be used, in which case the pumps may be controlled in an on/off fashion. For example, one pump may be on continuously but slower than the other pump, which is on intermittently. Regardless of the relative operation of the pumps, it is important that neither pump be off for a time sufficient to allow enough of the solids in the suspension or emulsion to separate, such that the product becomes out of specification with respect to the dispersed-phase content (i.e., the "maximum separation time").

Figure 3:
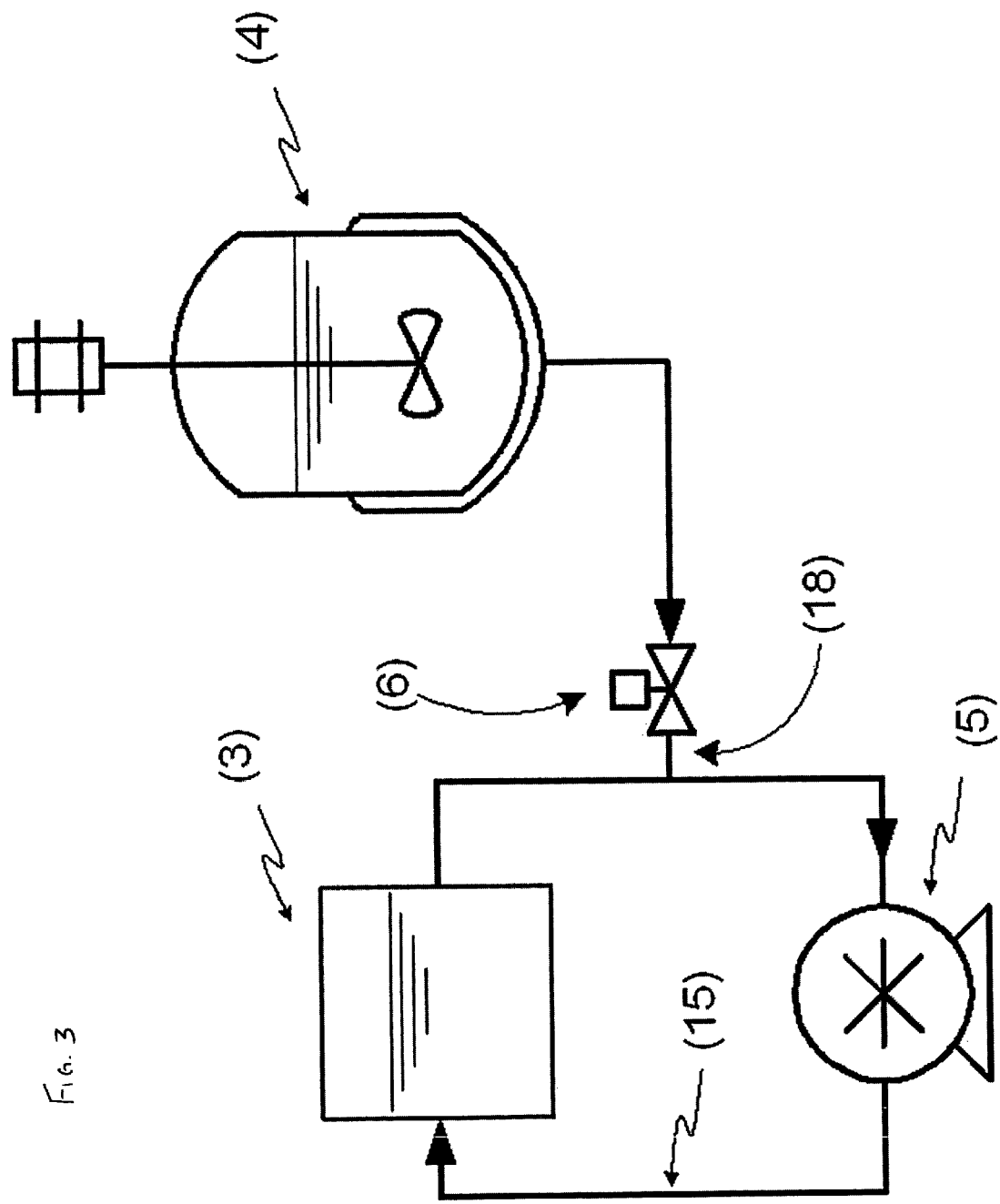
FIG. 3 is a schematic diagram showing a second embodiment of the dispense system in accordance with the present invention.

FIG. 3 illustrates a second embodiment of the present invention, where a circulation-loop scheme is used to maintain flow through the dispense cartridge (3). A non-invasive pump (5), such as a peristaltic pump, circulates the product through a tubing loop (15) in fluid communication with an inlet and outlet of the reservoir of the dispense cartridge (3). Thus, the intake of pump (5) is in fluid communication with an outlet of the reservoir of the dispense cartridge (3), and the outtake of pump (5) is in fluid communication with an inlet of the reservoir of the dispense cartridge (3). The pump (5) is preferably on continuously during operation of the system to maintain the fluid in motion.

Tubing loop (15) is connected to a well mixed, bulk fluid supply source (4) by a relatively short length of suitable tubing (18) that passes through a valve (6), which may be a pinch valve. Preferably the valve (6) is controlled in response to the liquid level in the reservoir of the dispense cartridge (3), which may be determined with a level sensor.

This configuration requires that the pressure in the well mixed, bulk fluid supply source (4), at the transfer point, be greater than the pressure on the other side of the valve (6). This can be accomplished in any number of ways, such as by using gravity by elevating the bulk fluid supply -source (4) or by pressurizing the bulk fluid supply source or by introducing a Venturi restriction on the reservoir side of the valve (6) in line with the reservoir re-circulation loop. In order to avoid phase separation in the transfer tubing (18), the valve which when open allows fluid communication between the bulk fluid supply source (4) and tubing loop (15), should be opened frequently. One suitable alternative to transfer valve (6) is a non-invasive pump such as a peristaltic pump.

Figure 4:
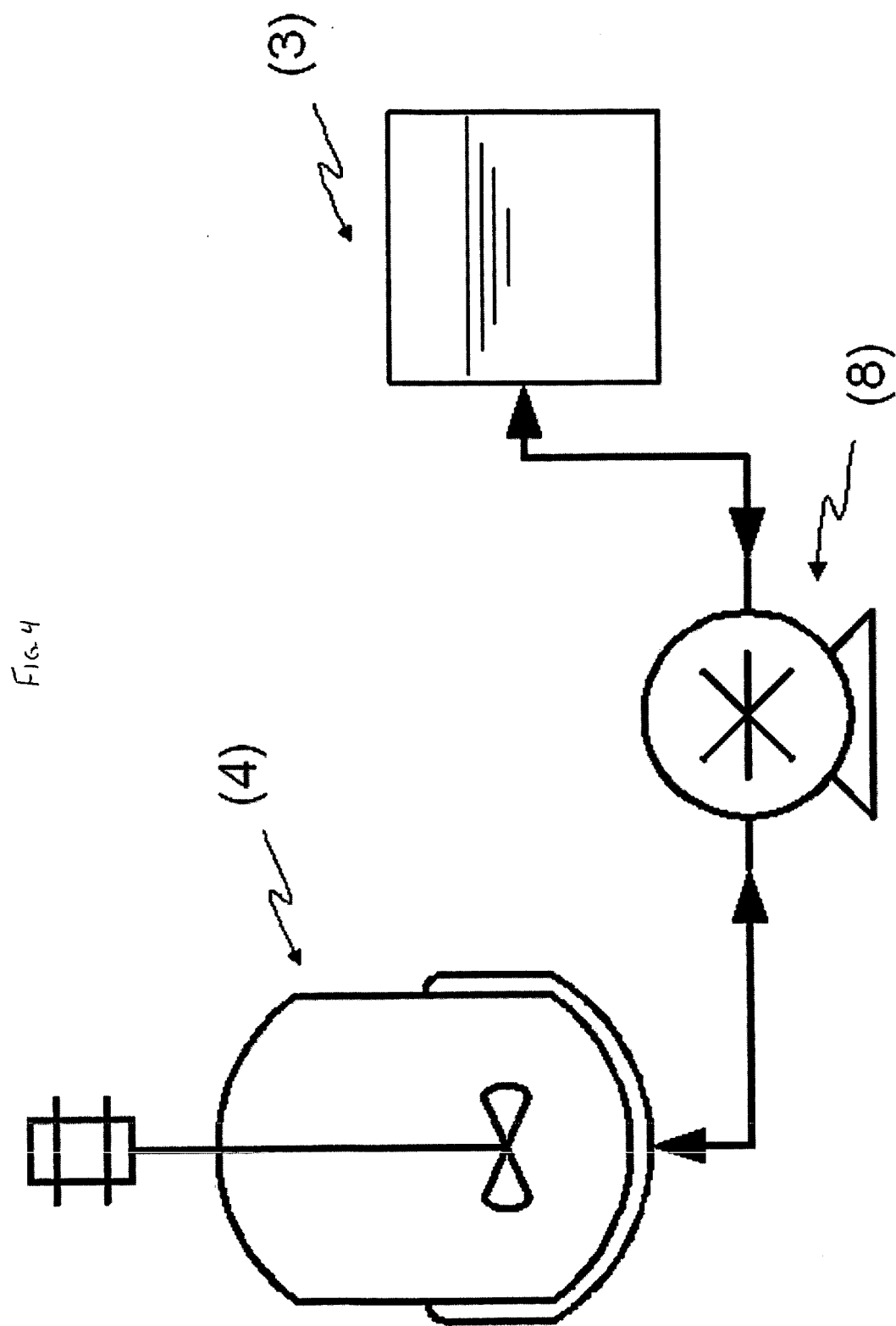
FIG. 4 is a schematic diagram showing a third embodiment of the dispense system in accordance with the present invention.

FIG. 4 illustrates yet a further embodiment of the present invention, where an alternating or reversing pump is used to maintain flow and mixing in the reservoir. A single peristaltic pump (8), capable of reversing direction, is in fluid communication with both the bulk fluid supply source (4) and the reservoir of the dispense cartridge (3) through suitable tubing. The fluid level in the reservoir of the dispense cartridge (3) is monitored, such as with a level switch. When the fluid level in the reservoir reaches a predetermined level, the pump (8) remains on but alternates direction so that product is alternately pumped into and out of the reservoir on a periodic or continuous basis. If the level in the reservoir of the dispense cartridge (3) falls below the predetermined level, the pump (8) is placed in a single direction mode to fill the reservoir to the desired level, and is then again placed in the alternating mode to alternately pump product into and out of the reservoir to maintain flow and prevent the solids from settling.

In the event the withdrawal of fluid from the reservoir of the dispense cartridge (3) does not mix the reservoir contents as efficiently as the filling of the reservoir, the speed of the pump (8) may also alternate in accord with the pump direction so that the time that the pump is withdrawing fluid is less than 50% of the pump cycle time or the cycle time may be minimized.

Figure 5:
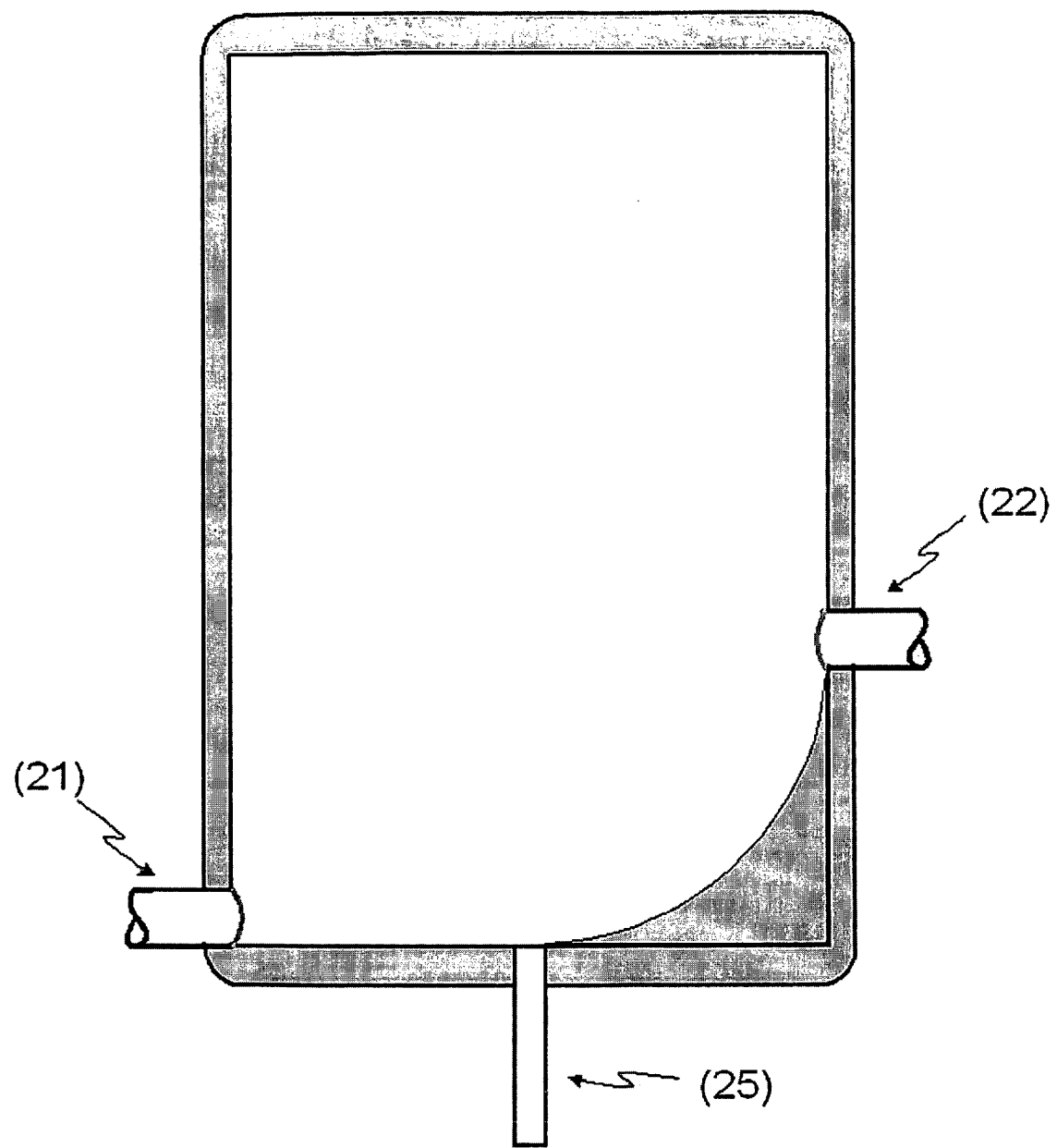
FIG. 5 is a schematic diagram showing an embodiment of the reservoir.

FIG. 5 shows a preferred embodiment of the reservoir (20) section of the dispense cartridge. The preferred embodiment is designed to maximize the fluid motion in the reservoir (20) and minimize any potential stagnation zones. This embodiment shows the inlet (21) and outlet (22) ports of the reservoir (20) located on opposite sides of the reservoir (20). A port (25) on the bottom of the reservoir (20) allows fluid to move to the tubing assembly used to deliver the product to its final containers (not shown).

Those skilled in the art will appreciate that although the above description details the use of tubing, other types of fluid lines are acceptable, including suitable ducting, piping, etc. In addition, those skilled in the art will appreciate the multitude of configurations available for the dispense cartridge reservoir and the multitude of configurations available for the circulation loop.

What is claimed is:

1. A fluid dispensing apparatus for dispensing a predetermined volume of fluid, comprising a reservoir having a dispense port, a first pump in fluid communication with a fluid source comprising a two-phase fluid and said reservoir for pumping said two-phase fluid into said reservoir, a second pump in fluid communication with said reservoir and said fluid source for pumping said two-phase fluid from said reservoir, and a fluid level determining device for determining the fluid level in said reservoir, wherein in response to said determined fluid level, said first and second pumps maintain circulation between said fluid source and said reservoir such that a constant liquid level in said reservoir is ensured, and such that said two-phase fluid remains homogenous.

2. The fluid dispensing system of claim 1, wherein said first and second pumps are peristaltic pumps.

3. The fluid dispensing system of claim 1, wherein said fluid is a suspension.

4. The fluid dispensing system of claim 1, wherein said fluid is an emulsion.

5. The fluid dispensing system of claim 1, further comprising a controller responsive to said fluid level determining device for controlling the speed of said first and second pumps based upon the fluid level in said reservoir.

6. The fluid dispensing system of claim 1, further comprising a dispense cartridge which houses said reservoir.

7. A method of minimizing in a reservoir the separation of a two-phase fluid, comprising providing a supply source of said fluid in fluid communication with said reservoir, determining the level of said fluid in said reservoir, pumping said fluid from said source to said reservoir with a first pump, and pumping said fluid from said reservoir to said source with a second pump, wherein in response to said determined fluid level, said first and second pumps maintain circulation between said supply of fluid and said reservoir such that a constant liquid level in said reservoir is ensured, and such that said two-phase fluid remains homogenous for ultimate dispensing from said reservoir to a point of use.

8. The method of claim 7, wherein said fluid is a suspension.

9. The method of claim 7, wherein said fluid is an emulsion.

* * * * *